United States Patent
Tanaka et al.

[15] 3,652,396
[45] Mar. 28, 1972

[54] PROCESS FOR PREPARING CITRIC ACID BY FERMENTATION

[72] Inventors: Katsunobu Tanaka; Kazuo Kimura, both of Tokyo-to, Japan

[73] Assignee: Kyowa Hakko Kogyo Kabushiki Kaisha (Kyowa Hakko Kogyo Co., Ltd.), Tokyo, Japan

[22] Filed: July 18, 1968

[21] Appl. No.: 745,713

[30] Foreign Application Priority Data

July 21, 1967 Japan....................................42/46586

[52] U.S. Cl..............................................................195/28
[51] Int. Cl. .........................................................C12b 1/00
[58] Field of Search.................................195/3 H, 28, 37, 36

[56] References Cited
UNITED STATES PATENTS 2,973,303  2/1961  Kinoshita et al..........................195/36
3,271,266  9/1966  Laine et al..................................195/3
3,285,828  1/1966  Gold et al..................................195/36

OTHER PUBLICATIONS

Marko Vetz et al. Applied Microbiology Vol. 16. p. 487–489, 1968.

*Primary Examiner*—A. Louis Monacell
*Assistant Examiner*—Gary M. Nath
*Attorney*—Bacon and Thomas

[57] ABSTRACT

A process for preparing citric acid by culturing in a culture medium containing a hydrocarbon as the principal carbon source, a fungus of the genus Penicillium having the ability to metabolize the hydrocarbon to produce citric acid as a metabolite and recovering the accumulated citric acid.

5 Claims, No Drawings

PROCESS FOR PREPARING CITRIC ACID BY FERMENTATION

BACKGROUND OF THE INVENTION

The present invention is concerned with a process for preparing citric acid by fermentation, which involves the use of hydrocarbon as the main carbon source.

It is known to carry out fermentation to produce citric acid by using various saccharide-containing materials as raw materials. However, when cheap saccharide-containing materials, such as molasses are used, hazardous pretreatments and complicated fermentation control are required due to the fact that large amounts of inorganic substances contained in such raw materials exhibit a deteriorative influence upon the fermentation process.

We have conducted research concerning the possibility of utilizing hydrocarbons as a cheap carbon source in fermentation, and have discovered that a relatively large number of fungi are capable of growing in a culture medium containing hydrocarbons as the main carbon source and that some of them possess a remarkable ability to produce citric acid.

The fermentative production of citric acid using such fungi with a hydrocarbon as the main carbon source has the following advantages:
1. Cheap carbon source. 2. Lack of fermentation-inhibiting factors such as e.g., metallic salts, phosphates, etc. 3. Easy control of the composition of the culture medium. 4. Easy recovery of the carbon source. 5. Easy control of the concentration of the culture medium. 6. Easy handling of the carbon source. 7. Easy purification and isolation of the final product from the fermentation broths.

These advantages are not realized when carrying out conventional citric acid fermentation, and the process according to the present invention, which involves the use of hydrocarbons as the main carbon source, is clearly far superior to those using saccharides as the main carbon source in the conventional manner. Moreover, the product obtained by the process according to the present invention consists almost entirely of citric acid, i.e., little or no acids, such as e.g., gluconic acid, oxalic acid etc., are formed as by-products as is often the case with conventional citric acid fermentation processes. Such by-products as $\alpha$-ketoglutaric acid, glutamic acid and other organic acids, which are often found in products derived from bacteria, are essentially nonexistent in the product of the process of the present invention.

DETAILED DESCRIPTION OF THE INVENTION

We have found that a large number of fungi belonging to the genus Aspergillus and Penicillium may be used for the purpose of the present invention. Best results have been obtained by using the fungi listed as follows: Aspergillus auricomus (Genguen) Saito, Asp. elegans Gasperini (ATCC 20108), Asp. melleus Yukawa, Asp. ochraceus Wilhelm, Asp. repens (Corda) de Bary, Asp. rugulosus Thom & Raper, Asp. usamii, Asp. ustus, Asp. terricola var. americans Marchal 588, Penicillium janthinellum, Pen. decumbens, Pen. echinulo nalgiovens, Pen. estinogenum, Pen. restrictum ATCC 13155, Pen. chermisinum Biourge, and Pen. paraherquei Abe.

All of these fungi are readily available. Aspergillus elegans Gasperini has been deposited without restriction as to its dissemination in the American Type Culture Collection in Washington, D.C.

Various mutants of these organisms prepared by conventional techniques may also be employed.

The following table shows the citric acid-producing abilities of various fungi, these having been determined by a procedure similar to that described in Example 1, which will be set forth hereinafter.

TABLE

| Strain | | | Amount of Citric Acid Produced in mg./ml. |
|---|---|---|---|
| Penicillium janthinellum | | JV8' 168-172-A-2 | 35 |
| Pen. | Jan. | 676 | 41 |
| Pen. | Jan. | 581 (ATCC 13154) | 45 |
| Pen. | Jan. | UV3'-168-197 | 32 |
| Pen. decumbens Thom var. atro-vilens Abe FAT 329 | | | 33 |
| Pen. echinulo-nalgiovens Abe FAT 884 | | | 46 |
| Pen. estinogenum Komatsu & Abe FAT 1196 | | | 30 |
| Pen. restrictum 241 (ATCC 13155) | | | 35 |
| Pen chermisinum Biourge FAT 1287 | | | 37 |
| Pen. paraherquei Abe FAT 670 | | | 34 |
| Aspergillus auricomus (genguen) Saito | | | 12 |
| Asp. elegans Gasperini | | | 10 |

In the table, "FAT" indicates that deposit of the organism was made with the Faculty of Agriculture of Tokyo University and "ATTC" means that deposit was made with the American Type Culture Collection, the numbers being those assigned by the collection.

Hydrocarbons which may be used in the practice of the present invention include e.g., paraffins, olefines and isoparaffins having various numbers of carbon atoms (preferably $C_{10}$–$C_{20}$), as well as gas oil, light oil, kerosene, crude oil, etc., and they may be used singly or in combination. The hydrocarbons may be in liquid or gaseous form.

As the inorganic nitrogen source, conventional compounds, such as ammonium sulfate, ammonium chloride, ammonium nitrate, and ammonium phosphate may be used. Best results are obtained using ammonium nitrate.

The citric acid fermentation can be carried out advantageously at a temperature range of between 20°–40° C. Ordinarily, good results can be achieved at about 28° C. Submerged liquid cultivation under aeration gives most favorable results, but it is possible to culture the fungi under surface culture conditions. The fermentation proceeds at a pH between 1.0 and 8.0, but best results are obtained at a pH of about 5.0. For this reason, it is preferred to add calcium carbonate. Alternatively, it is possible to add a suitable alkaline solution, such as e.g., caustic soda or calcium hydroxide, as the fermentation progresses.

Conventional fermentation techniques, such as e.g., the addition of methanol, potassium ferrocyanide, etc., can be incorporated in the process of the present invention without any deteriorative effect.

The citric acid formed in the fermentation broths can easily be recovered therefrom by conventional procedures.

In the culturing of micro-organisms according to the present invention, good results may be achieved, for example, by the following procedure:

Spores are cultured on malt extract agar slant at about 28° C. for about 3 days and inoculated to seed medium in an amount of one loopful to 10 ml. of the seed medium, which is cultured with shaking at 28° C. for 3 days. The seed culture is fed to a fermentation medium at an inoculum rate of 10 percent and the fermentation is carried out at about 28° C. with agitation.

The following nonlimitative examples will serve to illustrate the invention.

EXAMPLE 1

One loopful of Penicillium janthinellum 581 (ATCC 13154), which had been cultured on a malt extract agar slant medium at 28° C. for 3 days, was inoculated to a seed medium (20 ml.) containing 5 percent of a mixture of normal paraffins (composed of equal volumes of paraffins having respectively 12 to 14 carbon atoms), 0.2 percent of $NH_4NO_3$, 0.03 percent of $MgSO_4.7H_2O$, 0.25 percent of $KH_2PO_4$, 0.025 percent of $Na_2HPO_4.12H_2O$, 0.001 percent of $CaCl_2.2H_2O$, 0.001 percent of MnSO$_4$.4H$_2$O, 0.002 percent of ZnSO$_4$.7H$_2$O, 0.5 mg/l of H$_3$BO$_3$, 0.1 percent of corn steep liquor, 0.05 percent of Nonion OT 221 [nonionic surface active agent available from Nippon Yushi K.K., Japan], 10γ/1 of Na$_2$MoO$_4$.2H$_2$O, 10γ/1 of CuSO$_4$.5H$_2$O, 10γ/1 of CoCl$_2$2H$_2$O, 10mg/l of FeSO$_4$.7H$_2$O and 3 percent of CaCO$_3$ and having a pH of 5, the seed medium being contained in a 250 ml. convoluted flask. The inoculated medium was cultured with shaking at 28° C. for 3 days. The seed was put at an inoculum rate of 10 percent into 20 ml. of a fermentation medium containing 10 percent of a mixture of paraffins having the same composition as that employed in the seed medium, 0.1 percent of NH$_4$NO$_3$, 0.02 percent of MgSO$_4$.7H$_2$O, 0.025 percent of KH$_2$PO$_4$, 0.025 percent of Na$_2$HPO$_4$.12H$_2$O, 0.001 percent of CaCl$_2$.2H$_2$O, 0.001 percent of MnSO$_4$.4HB$_2$O, 0.001 percent of ZnSO$_4$.7H$_2$O, 0.5 mg./l of H$_3$BO$_3$, 0.05 percent of corn steep liquor, 0.05 percent of Nonion OT 221, 10γ/1 of Na$_2$MoO$_4$.2H$_2$O, 10γ/1 of CuSO$_4$.5H$_2$O, 10γ/1 of CoCl$_2$.2H$_2$O, 3 mg/l of FeSO$_4$.7H$_2$O, 4 percent of CaCO$_3$ and having a pH of 5, the fermentation medium being contained in a similar flask. The fermentation was carried out with shaking (220 r.p.m.) at 28° C for 14 days to yield crystals of calcium citrate, which correspond to 40 mg./ml. of citric acid.

To the thus obtained fermentation broth containing crystalline calcium citrate, there was added 2N HCl so as to dissolve the crystals entirely. The broth was filtered to remove microbial bodies. After this, 1N H$_2$SO$_4$ was added slowly to the filtrate until no turbidity was observed and then filtration was carried out to remove the precipitate CaSO$_4$. The filtrate was concentrated, cooled and allowed to stand to precipitate citric acid crystals. The crystals were collected by filtering, washed with cold water and concentrated several times. By recrystallization from water, there were obtained crystals of the monohydrate of citric acid (0.62 g.; purity 96 percent).

EXAMPLE 2

A seed culture of Penicillium echinulo-nalgiovens Abe FAT 884 obtained in a similar manner to that described in Example 1 was transferred to a 500 ml. shouldered flask containing 20 ml. of a fermentation medium having a composition similar to that described in Example 1 with the exception of the addition of methanol (2 percent). Cultivation was carried out at 28° C. for 14 days with shaking (110 r.p.m.) to give crystals of calcium citrate corresponding to 55 mg./ml. of citric acid in the fermentation broth.

For purpose of comparison, a similar procedure was carried out without addition of methanol to yield calcium citrate corresponding to 40 mg./ml. of citric acid.

EXAMPLE 3

A seed culture of *Penicillium restrictum* 241 (ATCC 13155) was prepared by culturing with shaking in a 2 liter convoluted Erlenmeyer flask, a 200 ml. seed medium having a composition similar to that described in Example 1, and the seed culture was inoculated into a 5 liter fermentation vessel containing 3 liters of a fermentation medium similar to that described in Example 1 with the exception of the addition of 20 percent of kerosene in place of the normal paraffin mixture and the exclusion of CaCO$_3$. The cultivation was carried out at 28° C. under conditions of aeration (one liter/min.) for 10 days with shaking (600 r.p.m.) For the purpose of preventing a drop in Ph, a mixed solution of 3N–NaOH and 3N—Ca(OH)$_2$ (1:1) was used to maintain a pH of 5. A mixture of citric acid and calcium citrate which corresponded to 68 mg./ml. of citric acid was obtained in the fermentation broth.

EXAMPLE 4

Example 1 was repeated using Aspergillus elegans (ATCC 20108) as the citric acid-producing fungus. Crystals of calcium citrate corresponding to 11 mg./ml. of citric acid were accumulated in the fermentation broth.

To the thus obtained fermentation broth was added 1N HCl until the broth had an acidic pH whereby the crystals of calcium citrate were entirely dissolved. The broth was filtered to remove microbial bodies. The filtrate was concentrated and was neutralized by adding 1N NaOH 20 percent CaCl$_2$ aqueous solution was added until the filtrate had no turbidity. The precipitated calcium citrate was collected by filtering, was washed with water and concentrated several times. By recrystallization from water, there were obtained crystals of calcium citrate (0.15 g.; purity–97 percent).

We claim:

1. A process for preparing citric acid, comprising culturing in an aqueous medium containing a hydrocarbon as the main carbon source, mineral salts and an organic nitrogen source at a temperature within the range 20–40° C. and at a pH within the range of from 1–8, a fungus selected from the group consisting of *Penicillium janthinellum* 581 (ATCC 13154), *Penicillium decumbens Thom var. atro-vilens* Abe FAT 329, *Penicillium echinulonalgiovens* Abe FAT 884, *Penicillium estinogenum* Komatsu & Abe FAT 1196, *Penicillium restrictum* 241 (ATCC 13155), *Penicillium chermisinum* Biourge FAT 1286 and *Penicillium paraherquei* Abe FAT 670, said fungus having the ability to metabolize the hydrocarbon to produce citric acid, and separating the accumulated citric acid or salt thereof from the fermentation broth.

2. A process as defined in claim 1 in which said carbon source is at least one member selected from the group consisting of a paraffin, an olefin, and an isoparaffin having from 10 to 20 carbon atoms.

3. A process as defined in claim 1 in which said carbon source is at least one member selected from the group consisting of gas oil, light oil and kerosene.

4. A process as defined in claim 1 in which the culturing is carried out under submerged conditions with aeration.

5. A process as defined in claim 4 in which methanol or a ferrocyanide is added to the culture medium.

* * * * *